(12) United States Patent
Eggleton et al.

(10) Patent No.: US 6,782,148 B2
(45) Date of Patent: Aug. 24, 2004

(54) MODIFYING BIREFRINGENCE IN OPTICAL FIBERS

(75) Inventors: Benjamin John Eggleton, Summit, NJ (US); Charles Kerbage, Berkeley Heights, NJ (US)

(73) Assignee: Fitel USA Corp., Norcross, GA (US)

( * ) Notice: Subject to any disclaimer, the term of this patent is extended or adjusted under 35 U.S.C. 154(b) by 140 days.

(21) Appl. No.: 10/098,229

(22) Filed: Mar. 15, 2002

(65) Prior Publication Data

US 2003/0174985 A1 Sep. 18, 2003

(51) Int. Cl.⁷ .............................. G02B 6/00; G02B 6/20
(52) U.S. Cl. .......................... 385/11; 385/125; 385/43
(58) Field of Search .................. 385/125, 126, 385/43, 11, 123; 65/393, 399

(56) References Cited

U.S. PATENT DOCUMENTS

| | | | | |
|---|---|---|---|---|
| 6,366,722 | B1 | * | 4/2002 | Murphy et al. ............... 385/37 |
| 6,496,634 | B1 | * | 12/2002 | Levenson .................... 385/125 |
| 6,529,676 | B2 | * | 3/2003 | Eggleton et al. ............ 385/142 |
| 6,608,952 | B2 | * | 8/2003 | Eggleton et al. ............. 385/43 |
| 2001/0026667 | A1 | * | 10/2001 | Kawanishi et al. ......... 385/125 |
| 2001/0038740 | A1 | * | 11/2001 | Hasegawa et al. .......... 385/123 |
| 2002/0090160 | A1 | * | 7/2002 | Lim et al. ..................... 385/11 |

FOREIGN PATENT DOCUMENTS

EP        0-989-424 A2     3/2000

OTHER PUBLICATIONS

C. Kerbage et al. Microstructured optical fibre with tunable birefringence. Electronics Letters, vol. 38 No. 7, pp. 310–312, Mar. 2002.*

Kerbage C et al, Optics Express, Mar. 11, 2002, Opt. Soc. America, USA, vol. 10, No. 5, XP001154568 ISSN: 1094–4087 pp. 246–255.

Westbrook P S et al, IEEE Photonics Technology Letters, IEEE Inc., NEW York, US, vol. 12, No. 5, May 2000, pp. 495–497, XP000950309 ISSN: 1041–1135.

U.S. patent application Ser. No. 09/929,989, filed Aug. 15, 2001, "Fiber Apparatus And Method For Manipulating Optical Signals".

* cited by examiner

*Primary Examiner*—Hemang Sanghavi
*Assistant Examiner*—Mike Stahl

(57) ABSTRACT

Embodiments of the invention include an optical fiber device such as a tunable birefringent optical fiber having a core region, a cladding layer therearound, and a controllable active material disposed in, e.g., selective capillaries or pockets formed in the cladding layer. The active materials include, e.g., electro-optic material, magneto-optic material, photorefractive material, thermo-optic material and/or materials such as laser dyes that provide tunable gain or loss. The application of, e.g., temperature, light or an electric or magnetic field varies optical properties of the active material, which, in turn, varies or affects the propagation properties of optical signals in the device. The optical device can include a tapered region or long period grating that causes the core mode to spread or couple into the cladding region and, simultaneously, allows the active material to be relatively close to the propagated modes, thus allowing interaction between the active material and the propagating modes.

16 Claims, 7 Drawing Sheets

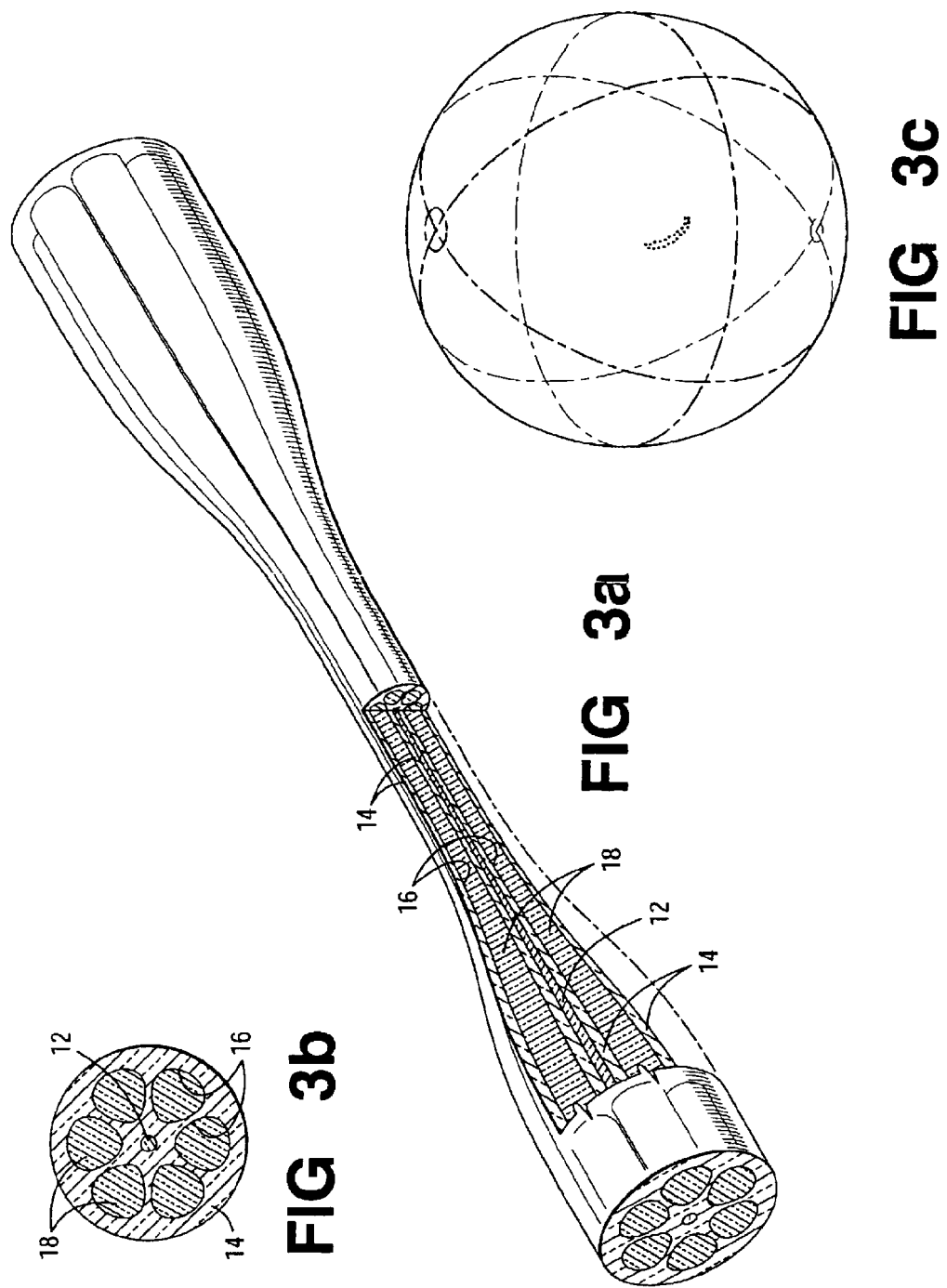

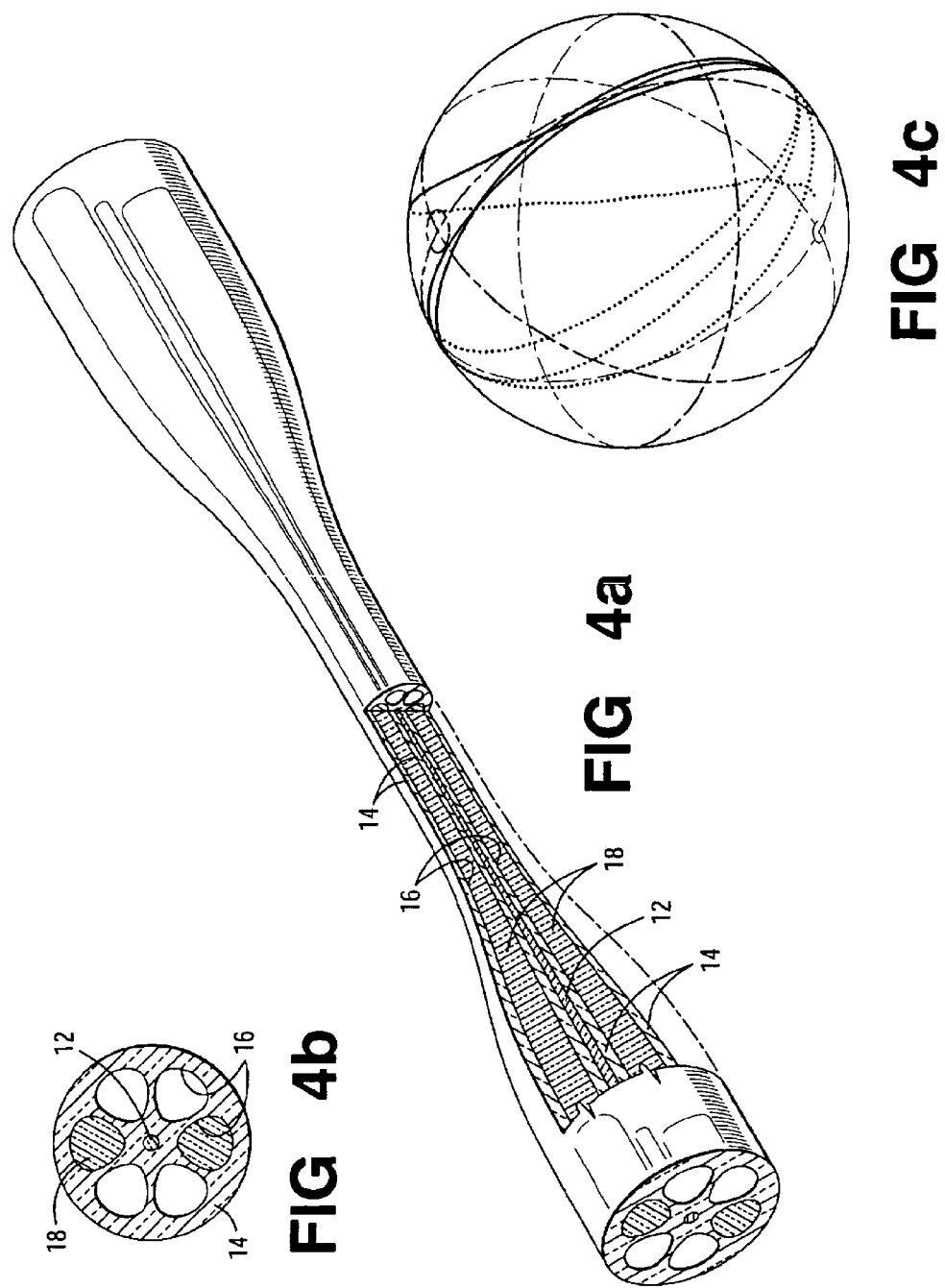

MODIFYING BIREFRINGENCE IN OPTICAL FIBERS

FIELD OF THE INVENTION

The invention relates to optical fiber devices and methods for tuning the birefringence of waveguides (polarization of optical signals) using such devices and methods. More particularly, the invention relates to all-fiber optical devices, methods and systems for modifying the birefringence in microstructured optical fibers.

BACKGROUND OF THE INVENTION

Optical devices that modify the properties of optical signals include devices such as modulators, attenuators, and polarization controllers. Such devices use various means to vary refractive properties of one or more regions of the device to change the amplitude/phase of a signal propagating through the device. Conventional devices of this kind use lithium niobate, electroabsorption and/or other configurations to affect the propagation properties (e.g., attenuation, birefringence) of an optical fiber or other waveguide arrangement. Typically, conventional modulators and other devices such as polarization controllers are relatively costly and bulky devices that introduce an undesirable amount of loss. However, all-fiber devices inherently exhibit lower loss and are easier to package than conventional devices.

For example, with birefringent optical fibers (or polarization maintaining fibers), the birefringence is categorized as geometrical birefringence or stress-induced birefringence. Geometrical birefringence is produced by the axially asymmetrical core or structures surrounding the core. Stress induced birefringence is generated by a non-symmetrical stress in the core, where stress applying rods with larger thermal expansion coefficients than silica are introduced in the vicinity of the core. For example, see FIG. 1. However, the configuration of such devices makes them relatively difficult to attain tunability in birefringence.

Accordingly, it is desirable to have available an all-fiber, optical device such as an optical birefringence device that has enhanced tunable birefringence, has easier manufacturability and generally is smaller in size than conventional polarization controllers and modulators, and is relatively easy to splice to conventional fibers.

SUMMARY OF THE INVENTION

The invention is embodied in an optical fiber device such as a tunable polarization dependent loss element, a polarization controller or a system for use therein, and a method for making the optical device. According to embodiments of the invention, polarization of light is manipulated in microstructured optical fibers. The ability to control light propagation is achieved by establishing spatial asymmetry within a device such as a microstructured optical fiber, e.g., by filling selected pockets or air-holes formed in the microstructured optical fiber with active/tunable materials. The fiber includes of a core and a surrounding cladding layer. Pockets are introduced in the cladding region and extend, e.g., in the axial direction of the fiber. Active materials are infused in the pockets to change the optical properties of the optical signal. The active materials include, e.g., electro-optic material, magneto-optic material, photo-refractive material and thermo-optic material. Those materials change their intrinsic optical properties such as their refractive index according to external field applied (e.g., temperature). That is, the application of, e.g., temperature, light (optical field) or an electric or magnetic field varies optical properties such as refractive index, loss, scattering, or birefringence of the active material, which, in turn, varies or affects the propagation properties of optical signals in the device.

According to an embodiment of the invention, the optical device includes a tapered region that reduces the diameter of the fiber device but maintains the relative dimensional proportions of the cross-sectional index as in the non-tapered regions. In the tapered region, the mode field is not supported by the doped core and spreads into the cladding region, where it interacts with the active materials. Simultaneously, the tapered region allows the active material to be physically closer to the propagated modes compared to conventional arrangements, thus allowing interaction between the active material and the propagating modes. The tapered region also is designed such that the fiber can be spliced to conventional optical fibers with relatively low insertion loss.

According to an embodiment of the invention, the optical device includes a grating such as a Fiber Bragg grating (FBG) or a long period grating (LPG) written in the photosensitive core of the optical fiber. The FBG or LPG includes periodic perturbations in the index of the core and, like the tapered region, enhances the interaction between the optical signal and the active material. The FBG or LPG couples light from the core mode of the fiber into a mode whose field distribution is spread in the cladding, which is sensitive to the change in the refractive index at the silica-air-holes interface. In this manner, the coupled light interacts with the active material.

To induce birefringence in the optical signal, materials are infused in the airholes in such a way to break the axial symmetry of the fiber. Axial asymmetry is achieved by sealing specific air holes with epoxy, so that only the open air holes are filled with polymer. In this manner, there will be a difference in the propagation constants of the orthogonally polarized modes, which is exhibited as birefringence in the fiber. Control (generating and tuning) of birefringence is achieved by filling selective air-holes with active material and by applying an external field to change the refractive index of the material.

For example, temperature-dependent polymers are infused in one or many holes to provide different birefringence. Such arrangements exploit enhanced tunability because the refractive index of the polymers have relatively large temperature dependences. Birefringence tuning is achieved by changing the index of the material (e.g., thermally in the case of polymers). Also, birefringence tuning is achieved electrically by using liquid crystals, whose refractive index varies electrically, in one or many of the holes.

According to other embodiments of the invention, birefringence tuning is achieved by infusing different materials in different holes (e.g., dn/dt>0 for some holes, dn/dT<0 for other holes). Also, birefringence is turned on/off by electrically driving micro-fluids, in one or different holes again, into the waist of the taper or in the region where a LPG is written in the core of the fiber.

BRIEF DESCRIPTION OF THE DRAWINGS

In the drawings:

FIG. 3a is a side, partial cross-sectional view of a tapered microstructured optical fiber having a symmetric mode field (i.e., all six holes are filled with active material);

FIG. 3b is an end, cross-sectional view of the fiber of FIG. 3a;

FIG. 3c is a corresponding Poincare sphere for the fiber of FIG. 3a;

FIG. 4a is a side, partial cross-sectional view of a tapered microstructured optical fiber having an asymmetric mode field (e.g., only two holes are filled with active material) according to an embodiment of the invention;

FIG. 4b is an end, cross-sectional view of the fiber of FIG. 4a;

FIG. 4c is a corresponding Poincare sphere for the fiber of FIG. 4a;

FIG. 6b is a graphical diagram of the corresponding LPG transmission spectra at different temperatures for the orthogonal polarization states (solid and dotted lines) of the microstructured optical fiber of FIG. 6a;

FIG. 7b is a graphical diagram of the corresponding LPG transmission spectra at different temperatures for the orthogonal polarization states (solid and dotted lines) of the microstructured optical fiber of FIG. 7a;

DETAILED DESCRIPTION

Figure 1:
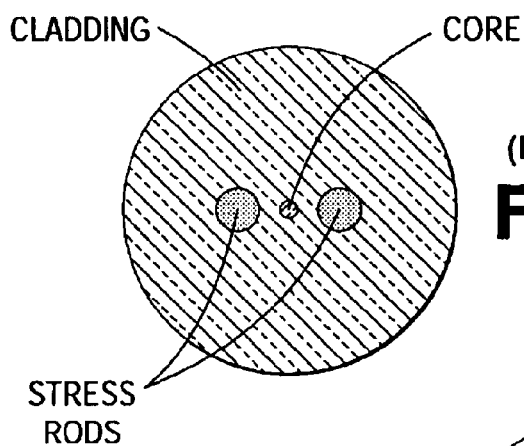
FIG. 1 is a simplified, cross-sectional view of a conventional birefringent fiber.

In the following description similar components are referred to by the same reference numeral to enhance the understanding of the invention through the description of the drawings. Also, unless otherwise explicitly specified herein, the drawings are not drawn to scale.

Although specific features, configurations and arrangements are discussed hereinbelow, it should be understood that such is done for illustrative purposes only. A person skilled in the relevant art will recognize that other steps, configurations and arrangements are useful without departing from the spirit and scope of the invention.

Figure 2:
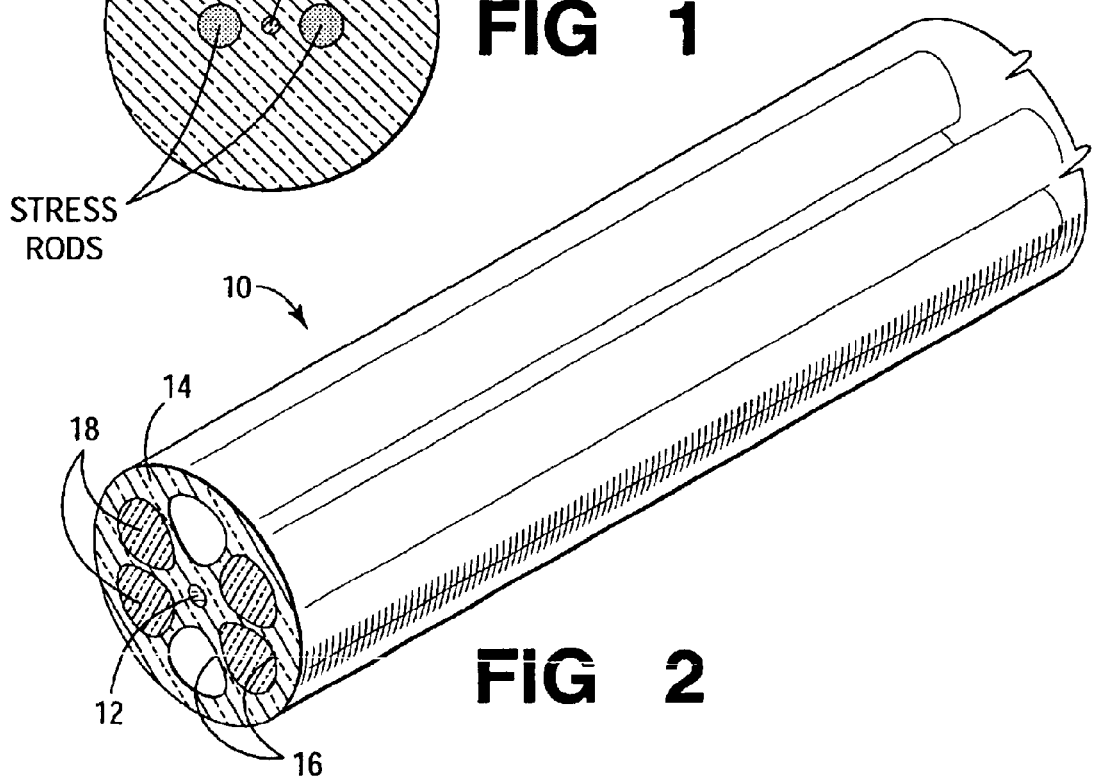
FIG. 2 is a side, partial cross-sectional view of an optical fiber device in which embodiments of the invention are applicable.

Referring now to FIG. 2, shown is a side, partial cross-sectional view of an optical fiber device 10 in which embodiments of the invention are applicable. The optical fiber device 10 includes an optical fiber comprised of a core or core region 12 surrounded by a cladding region or layer 14. The core region 12 is made of, e.g., silica (i.e., silicon dioxide, $SiO_2$) doped with germanium or other suitable material. The cladding layer 14, which has a refractive index less than that of the core region 12, typically is made of silica or silica doped with fluorine or other suitable material. The optical fiber is, e.g., an air-silica, microstructured fiber (MF) or microstructured optical fiber (MOF).

Multimode fiber supports many different modes (paths) of a particular wavelength, whereas singlemode fiber is designed to support only the fundamental mode ($LP_{01}$) of a particular wavelength. For multimode fiber, the diameter of the core region typically is approximately 50 or approximately 62.5 $\mu$m; for singlemode fiber, the diameter of the core region typically is less than approximately 10 microns ($\mu$m), e.g., 5–8 $\mu$m. For both singlemode and multimode fibers, the total diameter of the cladding layer 14 surrounding the core region 12 typically is approximately 125 $\mu$m. Typically, the cladding layer 14 is covered, for example, for protection and strength, with one or more coating or buffer layers (not shown), resulting in a total outer diameter of approximately 250–1000 $\mu$m.

The fiber device 10 includes active material formed or otherwise disposed in the cladding layer 14. For example, the cladding layer 14 includes one or more capillaries, voids air-holes or pockets 16 having active or tunable material (shown as 18) infused or otherwise disposed therein. The active material 18 varies the optical properties of optical signals propagating through the optical device 10. For example, the active material 18 is a controllable material whose refractive index can be varied to affect, e.g., the signal strength of optical information propagating through the fiber device 10. See, e.g., the co-pending application "Fiber Apparatus And Method For Manipulating Optical Signals", Ser. No. 09/929,989, Atty. Docket: Eggleton 28-25-1-18, filed Aug. 15, 2001 and assigned to the assignee of this application.

The active material 18 includes, e.g., electro-optic material such as polymer dispersed liquid crystals and organic non-linear materials, and/or magneto-optic material such as Europium-based magnetic materials, and/or photorefractive material such as azo compounds or stilbene derivatives, and/or thermo-optic material such as liquid crystals or polymers with sufficiently high dn/dT (where n is refractive index and T is temperature), and/or material that provides tunable gain or loss (e.g., laser dyes such as coumarins, substances containing rare-earth elements, and/or composite materials such as polymers dispersed with erbium particles), and/or other suitable material. According to embodiments of the invention, the application of an externally controlled force to the active material(s) results in changes in the optical properties, e.g., refractive index, of the active material(s), which, in turn, results in changes in the propagation properties of the optical signal. By establishing spatial asymmetry in the optical device by filling selected pockets with active material(s), embodiments of the invention tunably control the birefringence of the device.

The pockets or capillaries 16 typically are formed at the preform stage. For example, according to the "stack and draw" method, silica tubes, rods and core rods are bundled into a close-packed arrangement, and the assembly is over-clad to obtain the desired dimensions. The preform then is drawn into a fiber in such a way that the capillaries remain open by air pressure inside them, while unwanted holes are kept purged open so surface tension causes them to collapse. Other methods to form the capillaries in the preform are possible, e.g., sol-gel methods. Other methods to draw the preforms with capillaries also are available, e.g., the "cane" method, in which the preform is drawn into fiber in two high-tension steps; if the draw tension is much higher than the surface tension, hole collapse is prevented.

The active material 18 is introduced into the capillaries 16 of the device 10 preferably as a liquid. One way of introducing the active material 18 into the capillaries 16 is by immersing one end of the fiber device 10 into the liquid, and applying vacuum on the other end of the fiber device 10. Alternately, the liquid is forced into the capillaries 16 by using positive pressure. Once the active material 18 is inside the capillary, the active material 18 typically is left as a liquid (e.g., in the case of liquid crystals) and permanently sealed inside the fiber device 10 by plugging the capillaries 16 with a sealant or collapsing the capillaries 16 with heat.

Alternatively, the active material 18 is introduced as a liquid comprising polymerizable monomeric units. These monomeric units polymerize inside the capillaries 16 and are activated, e.g., by UV or visible light, by heat, or at room temperature as a result of mixing two or more reactive components. Once polymerized, the active material 18 is permanently trapped inside the capillaries 16. Yet another alternative is to introduce a solid active material (such as a polymer) as a liquid solution in a suitable solvent, in such a way that the solid material deposits inside the walls of the capillaries 16. The solvent then is removed, e.g., by evaporation, leaving behind a solid layer of the active material 18 deposited in the capillaries 16.

Alternatively, the active material 18 is introduced into the fiber device 10 before the fiber device 10 is drawn (i.e., at the preform stage).

According to embodiments of the invention, polarization of light is manipulated in optical devices such as the microstructured optical fiber 10 by establishing spatial asymmetry in microstructured optical fiber 10. Spatial asymmetry is established, e.g., by selectively filling the pockets 16 with the active material 18 and keeping the remaining pockets 16 filled with air or other suitable non-active material. Such selectively is done, e.g., by sealing specific pockets 16 with, e.g., epoxy or other suitable sealant, thus allowing only the open or non-sealed pockets to be filled with the active material 18. According to embodiments of the invention, establishing spatial asymmetry in the optical device 10 introduces birefringence in the fiber structure.

Often, the pockets 16 in the microstructured fiber device are sufficiently far from the core that they do not affect the core mode. Therefore, to study the birefringence of the polymer-air-silica microstructure, various configurations are used to couple light from the core mode to the cladding region where it can interact with the microstructure. For example, the fiber is tapered to achieve such interaction. Alternatively, a grating such as a fiber Bragg grating (FBG) or a long period grating (LPG) is written in the core to provide the desired interaction between the coupled light and the microstructure. The FBG or LPG couples light from the $LP_{01}$ mode in the core to the co-propagating $LP_{02}$ mode.

For example, see the tapered fibers shown in FIGS. 3a–c and FIGS. 4a–c. The fibers are tapered, e.g., by heating and stretching the fiber down to approximately 30 microns ($\mu$m) with a length of the waist of approximately 2 centimeters (cm). However, despite the reduced size of the tapered region, the refractive index profile of the fiber remains the same as in the non-tapered regions. For example, in the embodiment shown in FIGS. 3a and 4a, in the non-tapered regions, the outer diameter is approximately 125 $\mu$m, the diameter of the core region is approximately 5–10 $\mu$m, and the average diameter of the pockets is approximately 40 $\mu$m. In the tapered region, such relative proportions remain intact: the outer diameter is approximately 30 $\mu$m, the diameter of the core region is approximately 2 $\mu$m, and the average diameter of the pockets 16 is approximately 9 $\mu$m.

FIG. 3a shows a side, partial cross-sectional view of a tapered microstructured fiber having a symmetric mode field (i.e., all six holes are filled with active material). FIG. 3b shows an end, cross-sectional view of the tapered fiber, and FIG. 3c shows is a corresponding Poincare sphere for the tapered fiber. When all six air-holes are filled with polymer, the fiber structure retains its axial symmetry.

FIG. 4a shows a side, partial cross-sectional view of a tapered microstructured fiber having an asymmetric mode field according to embodiments of the invention. In this arrangement, only two holes are filled with active material. However, other asymmetric arrangements are possible according to embodiments of the invention.

In the Poincare sphere, the polarization state does not change by heating the fiber, as can be seen when comparing FIG. 4c to FIG. 3c. The Poincare sphere is a measure of the polarization state of the transmitted signal and illustrates changes in phase ($\phi$) between the orthogonal modes, which is also an indication in the change in birefringence from the following relation:

$$\phi=(\beta_x-\beta_y)L=2\pi(n_x-n_y)L/\lambda=2\pi BL/\lambda \quad (1)$$

where B=the birefringence, $\beta_x$=the propagation constant of the mode in the x direction, $\beta_y$=the propagation constant of the mode in the y direction, $n_x$=the effective index in the x direction, $n_y$=the effective index in the y direction, L=the length of the fiber waist, and $\lambda$=the operating wavelength. The relatively small change in the phase shift detected on the sphere when heated is an indication of low birefringence in the fiber. Such is expected since the effective indices of the orthogonal modes are the same.

However, when the structure of the fiber is asymmetric, e.g., by filling two opposite air-holes, as shown in FIG. 4b, the birefringence is relatively large. The relatively large birefringence is achieved, e.g., by heating the fiber and observing the change in the phase on the sphere. Because the effective index of the polymer has relatively large thermal coefficients (dn/dT is approximately $-4\times10^{-4}/^\circ$ C.), heating the fiber results in relatively dramatic changes in birefringence. The trace of the phase change on the Poincare sphere is a demonstration of the enhanced tunability attained in the birefringence of the fiber. Each rotation around the sphere corresponds to a phase shift of $2\pi$. In FIG. 4c, several rotations are shown on the sphere, which indicates a relatively high tunability attained in the fiber. The hysteresis effect of the device is relatively small as observed, thus the trace of the phase change on the sphere goes back to its original state after the fiber is cooled.

Figure 5A:
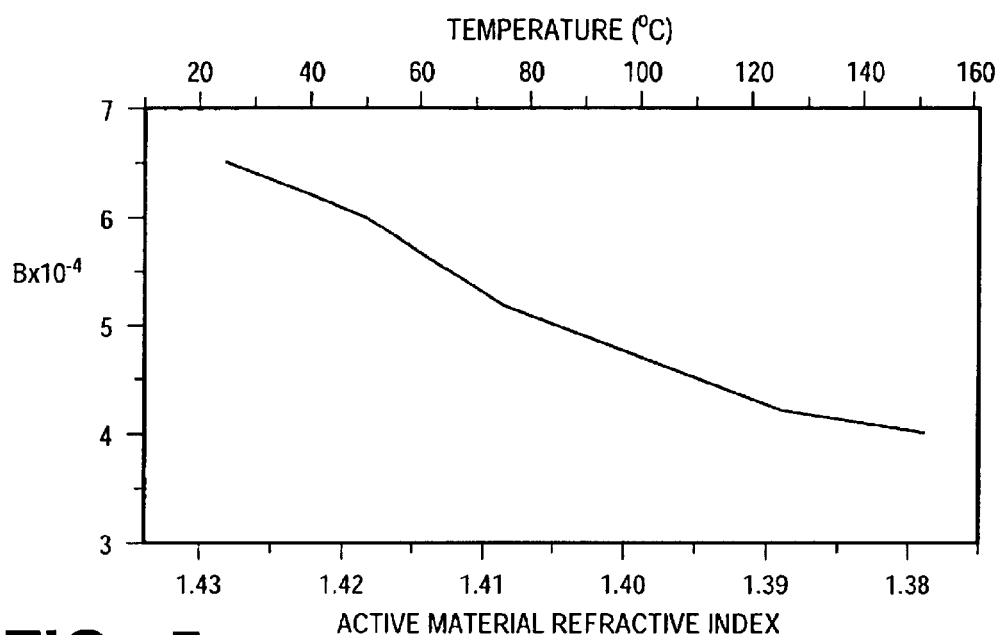
FIG. 5a is a graphical diagram of the calculated birefringence as a function of temperature or index of polymer of a microstructured optical fiber having an asymmetric mode field.
Figure 5B:
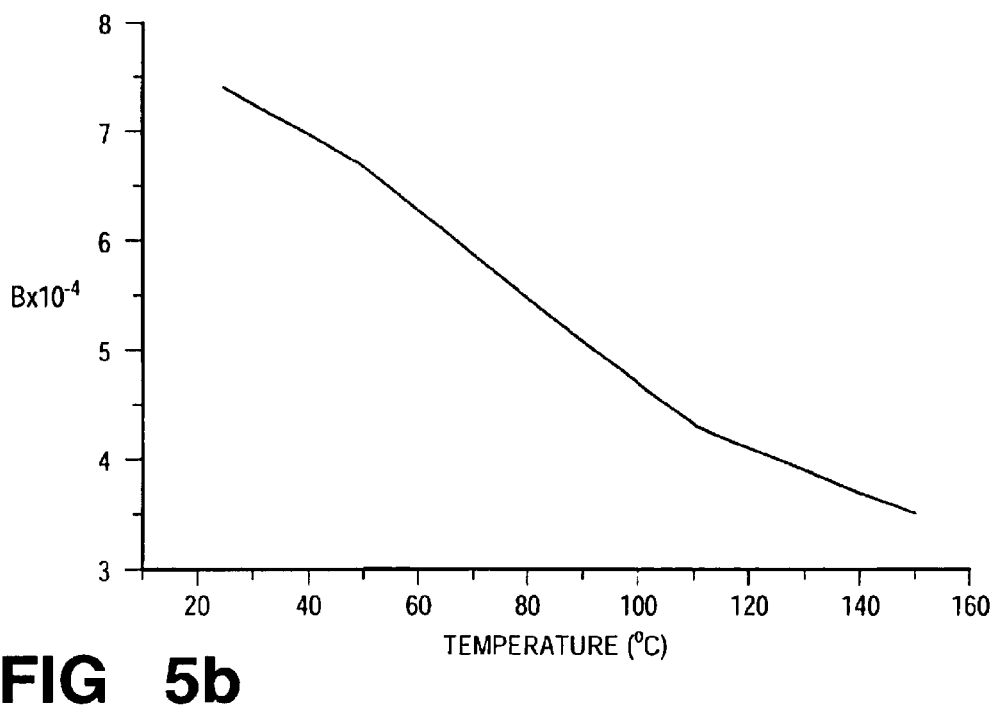
FIG. 5b is a graphical diagram of the measured birefringence as a function of temperature or index of polymer of a microstructured optical fiber having an asymmetric mode field.

In FIG. 5a, the calculated birefringence is plotted as a function of temperature and refractive index of the active material. In FIG. 5b, the measured birefringence is plotted as a function of temperature and refractive index of the active material.

Referring now to FIGS. 6a–b and 7a–b, birefringence structures are characterized, e.g., by measuring polarization splitting in the transmission spectra of a long period grating (LPG) written in the core of the structure. The results shown demonstrate the ability to tune and manipulate birefringence in the cladding region and also indicate that a microstructure optical fiber with either six-fold symmetry (FIG. 6a) or two-fold symmetry (FIG. 7a) exhibits reduced birefringence. The coupling is measured as a wavelength dependent loss peak in transmission determined by the phase matching condition $$\lambda = \Lambda_{LPG}(n_{co} - n_{cl}) \quad (2)$$

where $\Lambda_{LPG}$ is the LPG period, $n_{co}$ and $n_{cl}$ are the effective indices of the $LP_{01}$ and $LP_{02}$ modes, respectively. If there is birefringence in either the core or the cladding regions, there will be two resonant wavelengths for the LPG, corresponding to the two principal axes of polarization (denoted x and y below), which have different effective mode indices. The wavelength splitting in the LPG spectra is then related to the birefringence B by $$\delta\lambda = |\lambda_x - \lambda_y| = |\Lambda_{LPG}(n_{co} - n_{cl_x}) - \Lambda_{LPG}(n_{co} - n_{cl_y})| = \Lambda_{LPG}|n_{cl_y} - n_{cl_x}| = \Lambda_{LPG} B \quad (3)$$

where B is the birefringence of the structure.

Figure 6A:
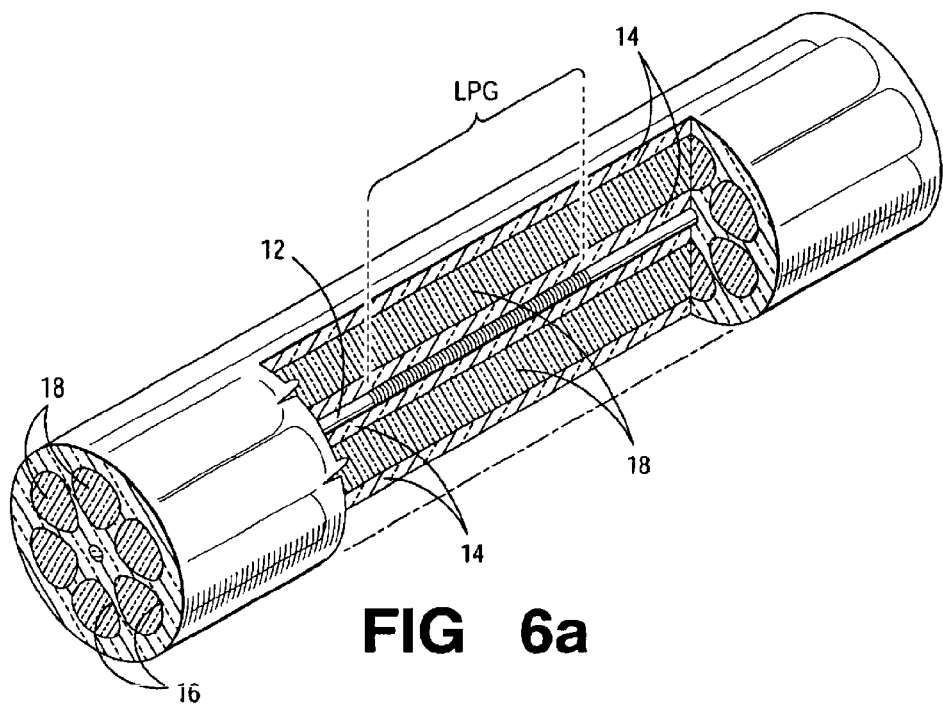
FIG. 6a is a side, partial cross-sectional view of a microstructured optical fiber having a long period grating written therein and having a symmetric mode field (i.e., all six holes are filled with active material)
Figure 6B:
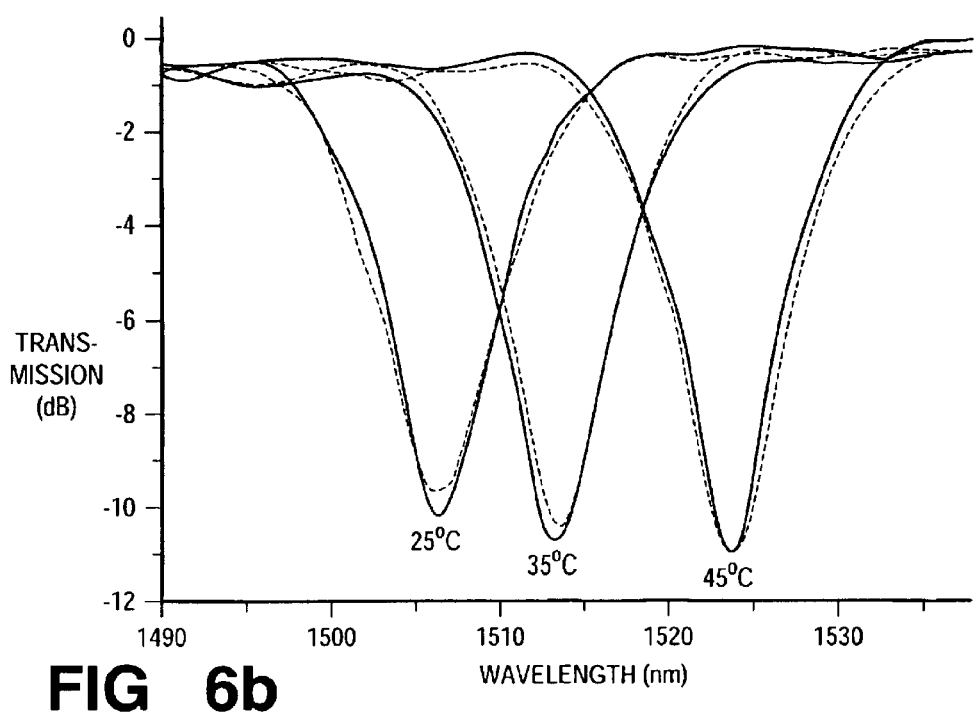
Figure 7A:
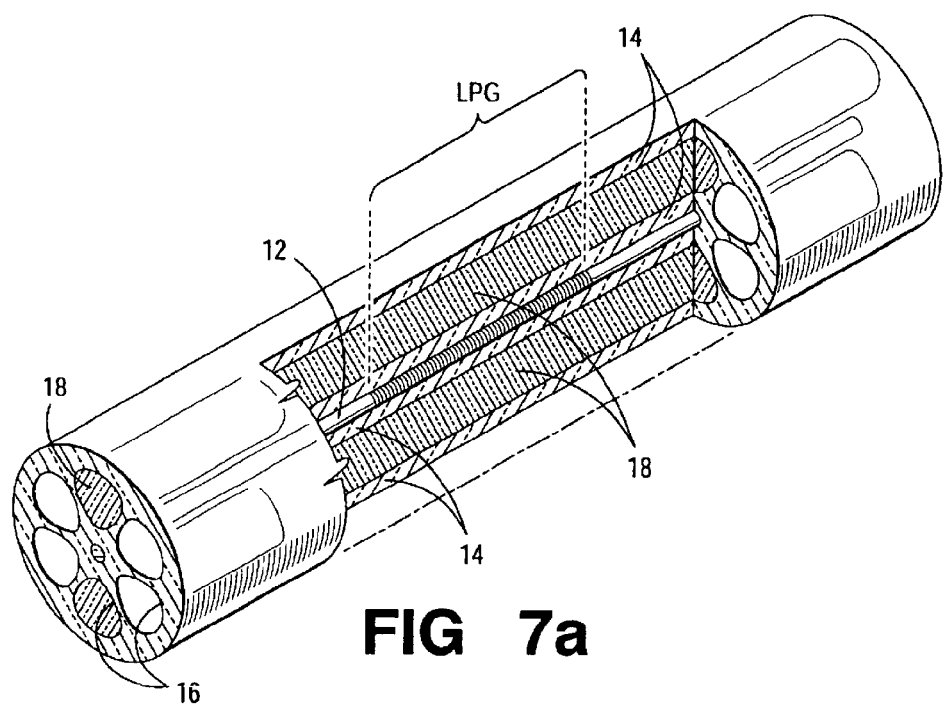
FIG. 7a is a side, partial cross-sectional view of a tapered microstructured optical fiber having a long period grating written therein and having an asymmetric mode field (e.g., only two holes are filled with active material)
Figure 7B:
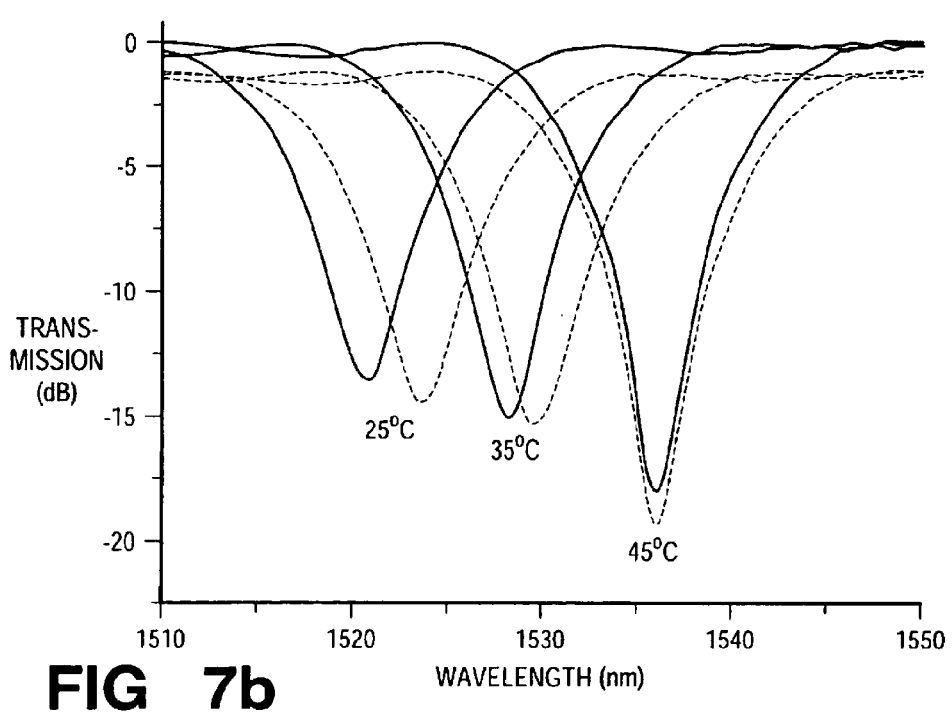

FIGS. 6a–b and 7a–b show measured transmission spectra for two different devices, one with all six holes filled with active material such as polymer (FIG. 6a) and the other with only two opposing holes filled with active material (FIG. 7a). The solid and dashed lines in the graphs of FIGS. 6b and 7b correspond to separate measurements taken for the two principal axes. At room temperature, the wavelength splitting is relatively small in the device in FIG. 6a (see FIG. 6b) and relatively large in the device in FIG. 7a (see FIG. 7b). From equation (3), it is seen that the six-fold symmetric structure (FIG. 6a) has relatively low birefringence, while the two-fold symmetric structure (FIG. 7a) has high birefringence. It should be noted that the small splitting in the six-fold symmetry case is caused by birefringence in the core induced during the process of writing the grating. Since the pockets are filled with a relatively high dn/dT polymer or other suitable active material, $n_{cl}$ is highly temperature dependent. Thus, a relatively significant shift in the resonance peak of the grating occurs with relatively small increases in temperature.

In the device shown in FIG. 6a, the shift is the same for both polarization axes. See, FIG. 6b. In the device shown in FIG. 7a, the shift is not the same for both polarization axes, and the wavelength splitting decreases as the device is heated. This is because $n_{cl}$ of the slow axis (i.e., when the polarization is aligned with the polymer-filled holes) is highly dependent on $n_{pol}$, while $n_{cl}$ of the fast axis (i.e., when polarization is aligned with the air-filled holes) is not. The splitting decreases because $dn_{pol}/dT$ is negative; heating brings $n_{pol}$ closer to $n_{air}$, thus restoring symmetry in the cladding. However, it should be noted that heating the device by only 25° Celsius eliminates most of the birefringence, even though $n_{pol}$ at this temperature (approximately 1.424) is still much greater than $n_{air}$.

Figure 8:
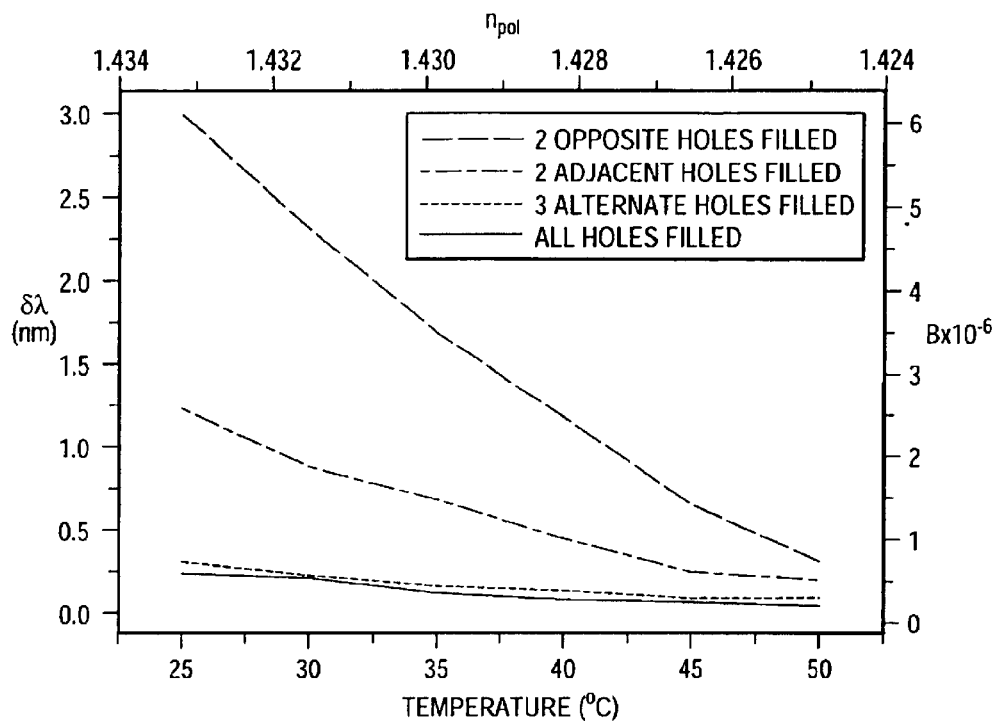
FIG. 8 is a graphical diagram of the wavelength splitting of the resonance ($\delta\lambda$) as a function of temperature for microstructure optical fiber arrangements in which all pockets are filled with index tunable active material, two adjacent pockets are filled with index tunable active material, three alternate pockets are filled with index tunable active material, and two opposite pockets are filled with index tunable active material.

Referring now to FIG. 8, shown is a graphical diagram of the wavelength splitting of the resonance ($\delta\lambda$) as a function of temperature for microstructure optical fiber arrangements in which all pockets are filled with index tunable active material, two adjacent pockets are filled with index tunable active material, three alternate pockets are filled with index tunable active material, and opposite pockets are filled with index tunable active material. The right axis shows the corresponding birefringence derived from equation (3). For structure arrangements with less than three-fold symmetry, the birefringence is much greater than, e.g., the three- and six-fold symmetric structure arrangements.

Figure 9A:
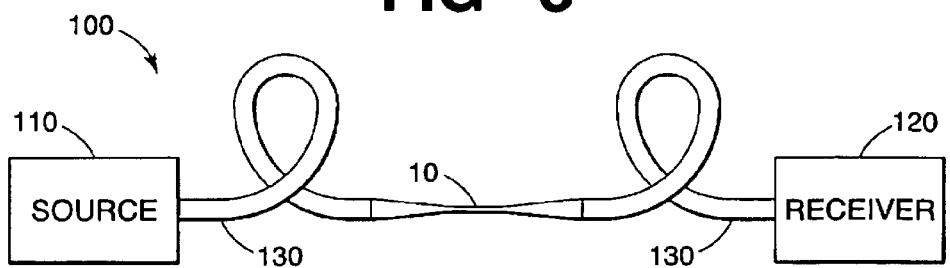
FIG. 9a is a simplified schematic diagram of an optical system in which embodiments of the invention are useful.
Figure 9B:
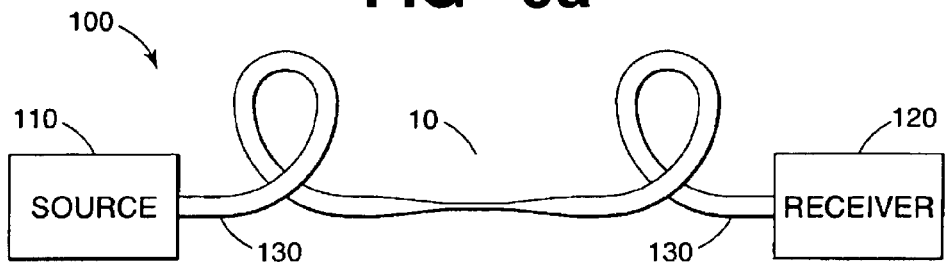
FIG. 9b is another simplified schematic diagram of an optical system in which embodiments of the invention are useful.

Referring now to FIGS. 9a–b, shown are simplified schematic diagrams of various system arrangements 100 in which microstructure optical fiber devices according to embodiments of the invention are useful. The system 100 includes one or more sources 110 for transmitting optical information, an optical transmission medium, and one or more receivers 120 for receiving the transmitted information. According to an embodiment of the invention as shown in FIG. 9a, the optical transmission medium includes at least one conventional fiber 130 coupled to the source 110 and at least one microstructured optical fiber device 10 according to embodiments of the invention, e.g., as described hereinabove. Also, e.g., at least one conventional fiber 130 is coupled between the fiber device 10 and the receiver 120. According to an embodiment of the invention as shown in FIG. 9b, the optical transmission medium includes at least one microstructured optical fiber or fiber device 10 coupled between the transmitter 110 and the receiver 120 and having a tapered region, e.g., as discussed hereinabove.

Figure 10:
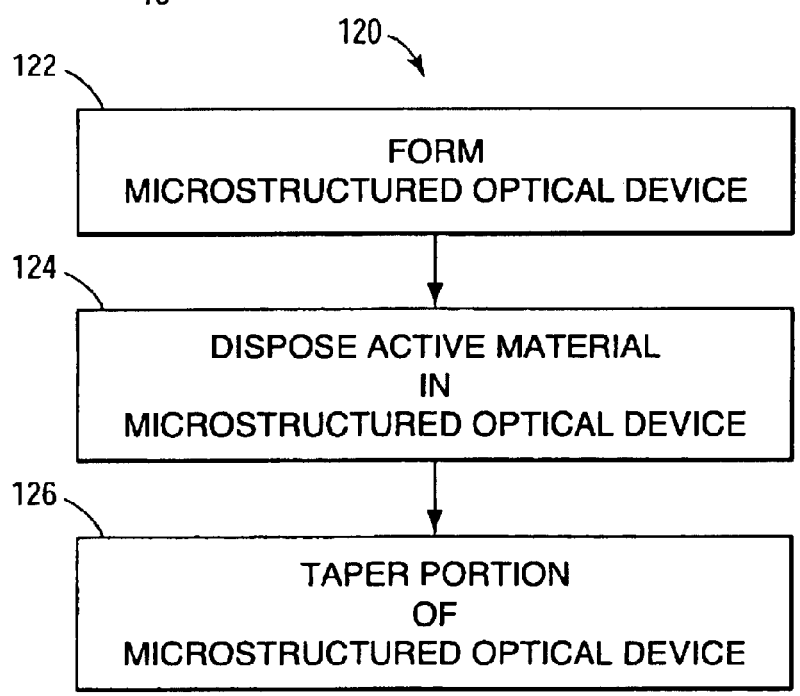
FIG. 10 is a simplified block diagram of a method for making optical fiber devices according to embodiments of the invention.

Referring now to FIG. 10, shown is a simplified block diagram of a method 120 for making optical fiber devices according to embodiments of the invention. The method 120 includes a step 122 of forming an optical fiber device having a core region, a cladding layer, and at least one air pocket in the cladding layer for disposing the active material. Another step 124 of the method 120 is to dispose the active material in the pocket(s) formed in the cladding layer in such a way that establishes spatial asymmetry therein. Alternatively, another step 126 of the method 120 is to taper at least a portion of the optical device.

It will be apparent to those skilled in the art that many changes and substitutions can be made to the embodiments of the optical fiber devices herein described without departing from the spirit and scope of the invention as defined by the appended claims and their full scope of equivalents.

What is claimed is:

1. An optical fiber device, comprising:
   a length of optical fiber having a core region, a cladding layer formed around the core region, and a plurality of pockets formed in the cladding layer radially about the core region,
   wherein at least one but not all of the plurality of pockets includes an active material disposed therein to cause the optical fiber device to be spatially asymmetric, and
   wherein the active material is capable of changing optical properties in such a way that varies the polarization of light propagating in the optical fiber.

2. The optical fiber device as recited in claim 1, wherein the length of optical fiber has a first diameter, and wherein at least a portion of the length of optical fiber includes a tapered region having a second diameter less than the first diameter.

3. The optical fiber device as recited in claim 2, wherein the core region and the cladding layer are configured in such a way that changing optical properties of the active material affects the propagation properties of optical signals in the tapered region and does not affect the propagation properties of optical signals not in the tapered region.

4. The optical fiber device as recited in claim 1, where the core region includes at least one grating written therein.

5. The optical fiber device as recited in claim 1, wherein the active material further comprises a magneto-optic material, wherein the magneto-optic material has an index of refraction that changes in response to changes in a magnetic field, and wherein at least one of the plurality of pockets is formed in the cladding layer in such a way that changes in the index of refraction of the magneto-optic material vary the polarization of light propagating in the optical fiber.

6. The optical fiber device as recited in claim 1, wherein the active material further comprises a thermo-optic material, wherein the thermo-optic material has an index of refraction that changes in response to changes in temperature, and wherein at least one of the plurality of pockets is formed in the cladding layer in such a way that changes in the index of refraction of the thermo-optic material vary the polarization of light propagating in the optical fiber.

7. The optical fiber device as recited in claim 1, wherein the active material further comprises a photorefractive material, wherein the photorefractive material has an index of refraction that changes in response to exposure to light at a given wavelength, and wherein at least one of the plurality of pockets is formed in the cladding in such a way that changes in the index of refraction of the photorefractive material vary the polarization of light propagating in the optical fiber.

8. The optical fiber device as recited in claim 1, wherein the active material further comprises an electro-optic material, wherein the electro-optic material has an index of refraction that changes in response to changes in electric field, and wherein at least one of the plurality of pockets is formed in the cladding layer in such a way that changes in the index of refraction of the electro-optic material vary the polarization of light propagating in the optical fiber.

9. The optical fiber device as recited in claim 1, wherein the index of refraction of the active material changes from a first value greater than the index of refraction of the core region to a second value less than the index of refraction of the core region.

10. A system for transmitting optical information, comprising:
 at least one source of optical energy;
 an optical cable coupled to the source for transmitting optical energy from the source; and
 a receiver coupled to the optical cable for receiving optical energy from the source,
 wherein the optical cable includes at least one length of optical fiber having
  a core region
  a cladding layer formed around the core region, wherein the cladding layer includes a plurality of pockets formed therein; and
  an active material disposed in at least one but not all of the plurality of pockets, wherein the disposed active material is spatially asymmetric within the length of optical fiber, and wherein the active material is capable of changing optical properties in such a way that varies the polarization of light propagating in the optical fiber.

11. The optical fiber device as recited in claim 10, wherein the length of optical fiber has a first diameter, and wherein at least a portion of the length of optical fiber includes a tapered region having a second diameter less than the first diameter.

12. The optical fiber device as recited in claim 10, where the core region includes at least one grating written therein, and wherein the at least one grating is selected from the group consisting of at least one long period grating and at least one fiber Bragg grating.

13. The optical fiber device as recited in claim 10, wherein the active material further comprises a magneto-optic material, wherein the magneto-optic material has an index of refraction that changes in response to changes in a magnetic field, and wherein at least one of the plurality of pockets is formed in the cladding layer in such a way that changes in the index of refraction of the magneto-optic material vary the polarization of light propagating in the optical fiber.

14. The optical fiber device as recited in claim 10, wherein the active material further comprises a thermo-optic material, wherein the thermo-optic material has an index of refraction that changes in response to changes in temperature, and wherein at least one of the plurality of pockets is formed in the cladding layer in such a way that changes in the index of refraction of the thermo-optic material vary the polarization of light propagating in the optical fiber.

15. The optical fiber device as recited in claim 10, wherein the active material further comprises a photorefractive material, wherein the photorefractive material has an index of refraction that changes in response to exposure to light at a given wavelength, and wherein at least one of the plurality of pockets is formed in the cladding in such a way that changes in the index of refraction of the photorefractive material vary the polarization of light propagating in the optical fiber.

16. The optical fiber device as recited in claim 10, wherein the active material further comprises an electro-optic material, wherein the electro-optic material has an index of refraction that changes in response to changes in electric field, and wherein at least one of the plurality of pockets is formed in the cladding layer in such a way that changes in the index of refraction of the electro-optic material vary the polarization of light propagating in the optical fiber.

* * * * *